Dec. 1, 1931.  E. O. ARNOLD  1,834,014
ELECTRIC HEATER
Filed March 17, 1930
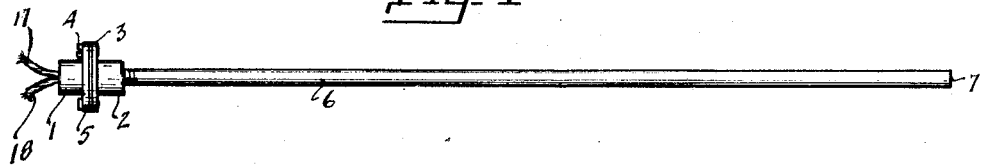
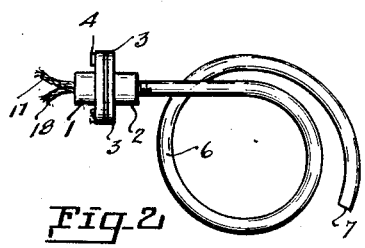
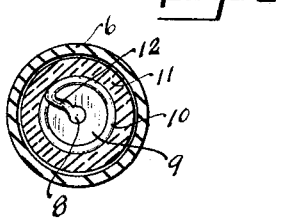
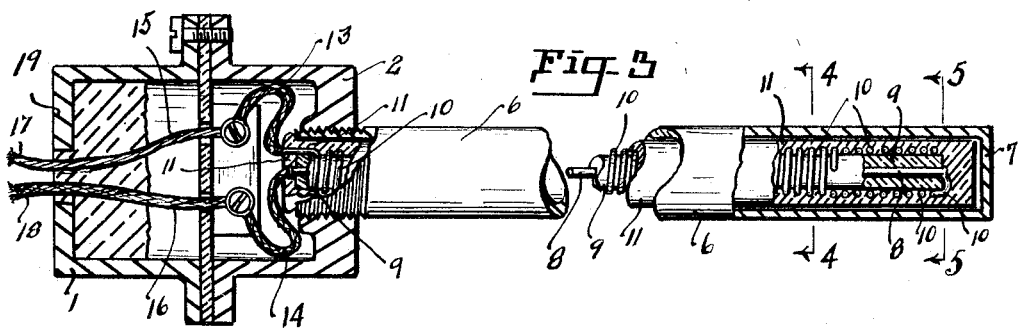
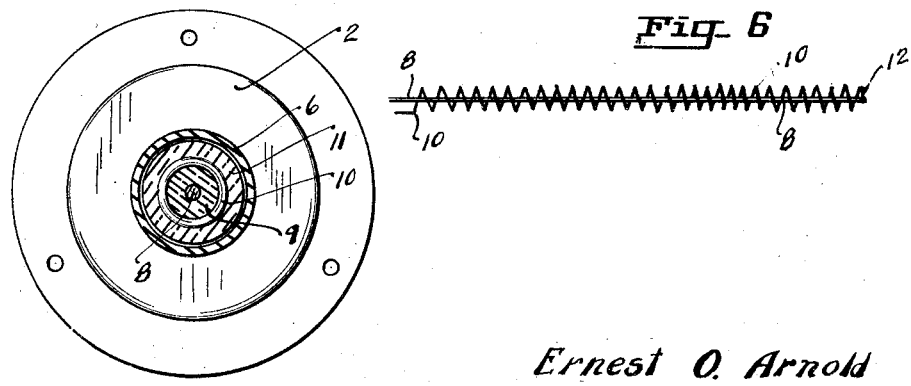
Ernest O. Arnold
INVENTOR
BY
ATTORNEY Patented Dec. 1, 1931

1,834,014

UNITED STATES PATENT OFFICE

ERNEST O. ARNOLD, OF PORTLAND, OREGON

ELECTRIC HEATER

Application filed March 17, 1930. Serial No. 436,533.

My invention is primarily intended for use in the heating of drinking water for poultry, but the same may be used with equal facility for the warming of drinking water for live stock and for other purposes.

The invention in its preferred embodiment consists in a water-proof metallic flexible shell having a flexible metal core disposed therein. The core is insulated from the shell and acts as the return for the electric current that passes through an electric heat element that is wound about the core and insulated therefrom and insulated from the metal jacket. The insulated resistance core assembly is removably disposed within the jacket and is also flexible. A flanged head is threadably secured to the metal jacket and is preferably composed of two independent elements each of which has a flange placeable in registerable alignment with the flange of the other half to facilitate the securing of the two together.

It is a well-known fact that the egg production of poultry is somewhat dependable upon the amount of water that they consume daily and it is a well-known fact also that the amount of water they drink depends upon the temperature of the same. According to the bulletin of the Oregon Agricultural College Experimentation Station, Circular 81, issued May, 1927, pullets drink 25.4% more warmed water than cold water during freezing temperatures. Water consumption was increased 5% per pullet and 4.2% per hundred eggs laid by warming it during average western Oregon winter weather, even though the temperature was above freezing 90% of the time.

In my new and improved heating device the same is adapted for placement either in elongated troughs or in circular vessels. The metallic shell with the insulated electrically heated core disposed therein because of their flexibility may be bent to practically any desired shape without the creating of shorts, within the electric circuit, and therefore makes my heating device adapted for practically any type of vessel used for the water supply for poultry.

The primary purpose of my invention is to provide an electric warmer that is efficient to build and efficient in its operation.

A still further object of my invention consists in providing an electric heating device that may be used by poultrymen over relatively long periods with freedom from operating annoyances.

A still further object of my invention consists in providing an electric heating device for the use of poultrymen and others that will be efficient in the consumption of electric energy for the amount of radiation that may be effectively delivered to the actual warming of the water.

A still further object of my invention consists in providing a construction and assembly that may be formed to meet the requirements after the assembly has been completed.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a plan view of the assembled device.

Fig. 2 is a plan view of the mechanism illustrated in Fig. 1, illustrating the core bent circular in plan to meet the requirements of circular drinking troughs.

Fig. 3 is a fragmentary, sectional, side view of the assembled device.

Fig. 4 is a cross section view taken on line 4—4 of Fig. 3, looking in the direction indicated.

Fig. 5 is a sectional, end view taken on line 5—5 of Fig. 3, looking in the direction indicated.

Fig. 6 is a diagrammatical layout of the circuit disposed within the device.

Like reference characters refer to like parts throughout the several views.

I preferably form my device having flanged heads 1 and 2. Each of the heads has a flange 3 disposed thereupon through which fastening elements 4 may be placed to secure the flanged heads together. A gasket 5 is disposed between the heads. The head 2 is detachably and threadably secured to the body element 6. The body element 6 is closed at its end 7 to seal the same to prevent the entry of liquids therein. A metallic core 8 runs centrally and longitudinally of the body element and is covered with an insulating shell 9. A resistance wire 10 is wound about the insulating core and an insulating jacket 11 is placed about the resistance wire to insulate the same from the jacket. The inner end 12 of the resistance wire is fixedly secured to the metallic core 8. The core acts as a return for the electric current. Electric conductors 13 and 14 are secured respectively to the resistance wire and to the metallic core. Terminals 15 and 16 are mounted within the gasket 5. The electric conductors 17 and 18 pass outward through the head 19. The openings through which the conductors pass may be sealed by any suitable sealing medium as by pitch or otherwise to prevent the entry of liquids into the core assembly.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A device of the class described comprising a pair of flanged heads, a flexible body element threadably secured to one of the flanged heads and having its free end closed, a flexible metallic core disposed centrally of and running longitudinally within the body element, a flexible insulating sheath disposed about the core, a resistance wire wound about the flexible sheath and secured to the metallic core at its lower end, a flexible insulating jacket disposed about the resistance wire, gaskets disposed between the pair of flanged heads to which the free end of the resistance wire, the free end of the metallic core, and a pair of conductors are attached, and an opening disposed through the free flanged head through which the electric conductors pass, said opening having a liquid tight seal disposed thereabout.

ERNEST O. ARNOLD.